US012505720B2

(12) United States Patent
Blinman

(10) Patent No.: US 12,505,720 B2
(45) Date of Patent: Dec. 23, 2025

(54) METHOD FOR A GAMING SYSTEM

(71) Applicant: Play'n Go Marks Ltd, Valletta (MT)

(72) Inventor: Connor Blinman, Valletta (MT)

(73) Assignee: PLAY'N GO MARKS LTD, Valletta (MT)

( * ) Notice: Subject to any disclaimer, the term of this patent is extended or adjusted under 35 U.S.C. 154(b) by 327 days.

(21) Appl. No.: 18/118,500

(22) Filed: Mar. 7, 2023

(65) Prior Publication Data

US 2023/0290214 A1 Sep. 14, 2023

(30) Foreign Application Priority Data

Mar. 9, 2022 (SE) .................................... 2250310-6

(51) Int. Cl.
*G07F 17/32* (2006.01)

(52) U.S. Cl.
CPC ...... *G07F 17/3223* (2013.01); *G07F 17/3213* (2013.01); *G07F 17/3267* (2013.01)

(58) Field of Classification Search
CPC ............. G07F 17/3211; G07F 17/3225; G07F 17/326; G07F 17/3213; G07F 17/3223; G07F 17/3267
See application file for complete search history.

(56) References Cited

U.S. PATENT DOCUMENTS 6,319,124 B1 * 11/2001 Baerlocher ............. G07F 17/34 463/31
6,375,570 B1 * 4/2002 Poole .................. G07F 17/3227 463/31
8,177,622 B2 * 5/2012 Englman ................. G07F 17/34 463/31
9,520,031 B2 * 12/2016 Brito ................... G07F 17/3265
9,728,050 B2 * 8/2017 Elias ........................ G07F 17/34
11,257,327 B1 * 2/2022 Sanborn .............. G07F 17/3213
2005/0075162 A1 * 4/2005 Duhamel ................ G07F 17/32 463/20
2008/0146319 A1 * 6/2008 Yoshizawa .......... G07F 17/3265 463/21
2010/0234089 A1 * 9/2010 Saffari ..................... G07F 17/34 463/43
2011/0201406 A1 * 8/2011 Jaffe ........................ G07F 17/34 463/21
2013/0109458 A1 * 5/2013 Demsetz ............. G07F 17/3265 463/20

(Continued)

FOREIGN PATENT DOCUMENTS

EP 3070692 A1 9/2016

OTHER PUBLICATIONS

Swedish Search Report dated Oct. 31, 2022 for Swedish Patent Application No. 2250310-6, 3 pages.

(Continued)

*Primary Examiner* — Chase E Leichliter
(74) *Attorney, Agent, or Firm* — RMCK Law Group, PLC

(57) ABSTRACT

The present disclosure relates to a computer implemented method performed by a gaming system. In particular, the present disclosure relates to a scheme for further improving a randomness in a game provided by means of the gaming system. The present disclosure also relates to a corresponding gaming system and a computer program product.

15 Claims, 5 Drawing Sheets

(56) References Cited

U.S. PATENT DOCUMENTS

2013/0217464 A1* 8/2013 Terdina ............... G07F 17/3288 463/20
2014/0087820 A1* 3/2014 Brune ................ G07F 17/3262 463/20
2014/0141860 A1* 5/2014 Meyer ................ G07F 17/3213 463/20
2015/0094132 A1* 4/2015 Elias ..................... G07F 17/34 463/20
2015/0332544 A1* 11/2015 Kitamura ............ G07F 17/3213 463/20
2016/0093153 A1* 3/2016 Hawkins ............. G07F 17/3244 463/20
2016/0232743 A1* 8/2016 Thomas .............. G07F 17/3213
2017/0024970 A1 1/2017 Sherrets et al.
2017/0053496 A1* 2/2017 Borissov ............. G07F 17/3267
2017/0316651 A1* 11/2017 Wortmann .......... G07F 17/3223
2017/0372558 A1* 12/2017 You ..................... G07F 17/3267
2018/0033253 A1* 2/2018 Vann ................... G07F 17/3246
2018/0061186 A1* 3/2018 Berman .............. G07F 17/3265
2018/0082546 A1 3/2018 Mariscal et al.
2018/0102020 A1* 4/2018 You ..................... G07F 17/3267
2018/0286183 A1* 10/2018 Davis ..................... G07F 17/34
2019/0102992 A1* 4/2019 You ..................... G07F 17/3213
2019/0304260 A1 10/2019 Bosak
2020/0005600 A1* 1/2020 Marks ................. G07F 17/3267
2020/0226883 A1* 7/2020 Gerchak ............. G07F 17/3288
2020/0294361 A1* 9/2020 Peterson ............. G07F 17/3265
2021/0019983 A1 1/2021 Hawkins et al.
2021/0366237 A1* 11/2021 Bouvier .................. G07F 17/34
2021/0375095 A1* 12/2021 Delekta ............... G07F 17/3265
2022/0012979 A1* 1/2022 Weatherby .......... G07F 17/3265
2022/0068083 A1 3/2022 Miliziano et al.
2022/0084352 A1* 3/2022 Ludwick ............. G07F 17/3267
2022/0351578 A1* 11/2022 Delekta ............... G07F 17/3265
2022/0351579 A1* 11/2022 Davis .................. G07F 17/3213
2023/0033113 A1* 2/2023 Penacho ............. G07F 17/3211
2023/0154285 A1* 5/2023 Cohn .................. G07F 17/3244 463/20
2023/0169820 A1* 6/2023 Warms .................... G07F 17/34 463/31
2023/0222868 A1* 7/2023 Dombi .................. G07F 17/326 463/20
2023/0290214 A1* 9/2023 Blinman ............. G07F 17/3225

OTHER PUBLICATIONS

Extended European Search Report dated Jul. 20, 2023 for EP Application No. 23158957.3, 10 pages.

* cited by examiner

METHOD FOR A GAMING SYSTEM

CROSS-REFERENCE TO RELATED APPLICATIONS

This application claims priority to Swedish Patent Application No. 2250310-6, filed on Mar. 9, 2022. The disclosure of the above application is hereby incorporated by reference in its entirety.

TECHNICAL FIELD

The present disclosure relates to a computer implemented method performed by a gaming system. In particular, the present disclosure relates to a scheme for further improving a randomness in a game provided by means of the gaming system. The present disclosure also relates to a corresponding gaming system and to a computer program product.

BACKGROUND

Games of chance are known and widely played for recreational purposes. The gaming industry has come to recognize that to sustain long term success it must be constantly innovative in introducing new games and new gaming concepts to the gaming public. One example of this innovating drive can be appreciated in the embrace of the Internet and online gaming by the gaming industry.

A common trend within the online gaming industry is to provide potentially new and current players with new means for attracting and ensuring that players remain at the online site, controlled by a gaming operator, providing the games. An example of such a means is the introduction of further unexpected scenarios in the game, potentially allowing a player to be further driven to play the game since the player has a desire to participate with the game in case of such an unexpected scenario appearing.

The introduction of possible unexpected scenarios in the game could also further increase the payout to the player, since the unexpected scenario possibly could add a further leverage to a bet placed by the player. Although this of course is of high interest to the player, such further possible payouts must be closely controlled by a gaming operator, ensuring that the payouts stay within desired boundaries. Thus, there is a general need to balance the attraction power of the game by means of possible further and higher payouts, while at the same time ensuring that an operator is in total control of the game.

SUMMARY

According to an aspect of the present disclosure, the above is at least partly met by a computer implemented method performed by a gaming system, the gaming system comprising a server comprising a monitoring module and a spin rendering module, and an electronic user device comprising a display screen providing a graphical user interface (GUI), wherein the electronic user device is connected to the server using a network connection, wherein the method comprises forming, at the server, a table having a predetermined dimension and comprising a plurality of adjacently arranged graphically rotatable reels, each graphically rotatable reel displaying a plurality of elements being one of a plurality of predefined element types, forming, in response to a request from the electronic user device to initiate a game, a graphical representation of the rotatable reels at the GUI of the electronic user device, wherein the reels are rotating for a predefined rotating time period, and matching, at the server and after the end of the predefined rotating time period, the elements at the adjacently arranged graphically rotatable reels with a plurality of predefined element formations stored at the server, wherein the method further comprises providing, at the server, an outcome indicative of the element matching to the monitoring module, wherein the monitoring module in real-time determines a performance metric based on a plurality of element matching outcomes from subsequent games, providing, at the server, the performance metric to the spin rendering module, wherein the spin rendering module in real-time and based on the performance metric determines an individual spin weight for each of the plurality of adjacently arranged graphically rotatable reels, and applying, at the server, the determined individual spin weight for each of the plurality of adjacently arranged graphically rotatable reels to a subsequently formed graphical representation of the rotatable reels.

Generally, when the operational scheme according to the present disclosure is applied to a game concept provided by the server, it may be possible to increase the randomization of the game, thus ensuring an improved integrity of the game as compared to prior-art implementations relying on random generated determinations, since known general computer-based issues relating to the generation of randomized material to the game are minimized. Additionally and advantageously, the suggested scheme may also, potentially, allow for increasing winning possibilities for a player participating in the game. This could potentially be beneficial to both the player participating in the game and the gaming operator providing the game.

These advantageous effects are achieved by the introduction of individual spin weights that are applied when the spin rendering module is calculation an operational movement of the reels when a game is executed. Additionally, to further heighten the randomness effect of these individual spin weights, a scheme is introduced where the spin weights are generated in response a procedure performed by the monitoring module for determining how a sequence of games, including at least two separate and consecutive games, are element matched. Accordingly, an accumulated element matching relating to the sequence of games will have an impact on the determination of the individual spin weights.

More specifically, in line with the present disclosure the monitoring module will in real-time receive the outcomes of the element matching and determine a performance metric, where this performance metric is the "seed" that will function to influence the determination of the individual spin weights. This intermediate operational function performed by the monitoring module allows for statistical manipulation of the outcomes of the element matching to ensure that the performance metric for example may be "smoothed out" in case of a large fluctuation of element matchings relating individual games. That is, one specific (individual) game may result in an element matching that potentially could greatly influence the performance metric. However, by applying statistical filtering to a plurality of consecutive outcomes of element matching it may be possible to ensure a less fluctuating performance metric whereby also the individual spin weights can be ensured to be less fluctuating (i.e. as compared to if the individual spin weights where made directly dependent on the outcomes of the element matchings). Ensuring less fluctuation of the individual spin weights will also result in an improvement in the perception of the behaviour of the graphically rotatable reels. The graphically rotatable reels are as such virtual reels, formed to be displayed at a display screen.

In some embodiments, a successful element matching involves matching at least three elements together. However, within the scope of the present disclosure it may also be possible to allow any form of combination of elements to be considered a successful element matching. That is, any combination of elements may be prestored with the server and used in matching the appearing elements within the table. Generally, not all element combinations will be course be subject to be treated as relevant. Rather, a selected plurality of predefined element formations will be stored at the server and used on the element matching process. Different element formation may have different value and may as such have different impact on the overall determination of the performance metric as is achieved by the monitoring module.

The general expression "matching" should however be interpreted broadly, including any elements that have been predefined as matching. Accordingly, matching elements must not necessarily be the same type of elements but could for example be related element types. As an example, if the server identifies that the elements of the tables are arranged in such a manner that a predetermined number of adjacent cells comprise matching elements, then this identified "cluster of elements" are matched with a plurality of predefined cluster formations. The types or elements may for example include numbers and/or symbols of any kind and matching a desired implementation of the game to be played by the player.

The definition of "adjacently" may be dependent on the specific implementation of the present scheme. For example, adjacently may be defined as arranged on the same row of the table or in the same column of the table. It may however also be possible to allow other cluster formations to be seen as adjacently, such for example comprising a combination of cells arranged both on different columns and on different rows, but at least sharing a side of a cell to another cell holding a matching element. Other definitions of clusters comprising matching elements are of course possible and within the scope of the present disclosure. Such a further example of a cluster may be where matching elements form specific "shapes", but not necessarily share a cell side with each other. Thus, two adjacent cells may possibly, in some embodiments, be seen as two cells at least having "touching" cell corners.

For ensuring that the matching is performed with a minimum amount of perceived delay in the progression of the game it is desirable to apply a computational efficient predefined matching scheme. Possible schemes that can be used in relation to the present disclosure include different forms of feature detection algorithms that today find usage within e.g. the computer vision field, such as for detecting and describing local features in images. In some embodiments of the present disclosure the predefined matching scheme may be selected to apply e.g. feature descriptors or feature vectors, where the plurality of predefined cluster formations are expressions of such feature descriptors or feature vectors. Other predefined matching schemes are also possible and within the scope of the present disclosure.

In some embodiments, the plurality of predefined cluster formations generates different gaming outcomes, where potentially in comparison more "complex" clusters comprising specifically "unusual" elements may generate a different gaming outcome as compared to a less complex cluster comprising "common" elements.

The individual spin weight may in some embodiments of the present disclosure be used for controlling at least one of a spinning direction of the reel, a rotational speed of the reel, a rotational order for each of the plurality of adjacently arranged graphically rotatable reels, a time offset or delay for initiating a rotation of the reel, and the predefined rotating time period for the reel. Accordingly, during operation of the game the reels may be operated individually and thus rotated differently as compared to each other. Obviously, such operation of the reels will further heighten the factual as well as a perceived randomness of the game, thus well aligned with the overall concept according to the present disclosure.

In one embodiment it may also or instead be possible to allow for the individual spin weight for the plurality of adjacently arranged graphically rotatable reels to be dependent on a predefined rotational order for all of the plurality of adjacently arranged graphically rotatable reels. That is, it may in such an embodiment be possible to not only infer individual rotational control of the reels, but also apply a directional control of the reel. As such, it is possible to overlay a further "filter" to the behavior of the reels during a game execution. It should however be noted that the individual spin weight in themselves may include a rotational component, meaning that a specific individual spin weight directly applied to a reel may have an effect on the rotational direction of that specific reel. The predefined rotational order may also in some situations be suitable for conveying a specific message to the player of the game, such as a status within the game, an expected time frame until a specific gaming feature, etc.

Predefining the rotational order for the adjacently arranged reels may also allow for a completely separate functionality in addition to the randomization enhancement as presented above. Specifically, by arranging the rotational order according to a predefined pattern it may for example be possible to convey additional information to the player in relation to e.g. a current state of the game. As an example, in case the determined performance metric has been "dropping" for a considerable time it could potentially be possible to make use of such information for ordering the rotational order according to one specific rotational pattern. For example, in case the performance metric has been dropping for a time period exceeding a predefined "dropping time threshold" the repetitive rotational pattern may be used to indicate to the player that a likelihood of an increasing performance metric (i.e. a win) is to be expected. As such, the repetitive pattern may function may be superimposed onto the determined spin weights, such that the randomization functionality of the spin weights is maintained while communicating said additional information.

In a possible embodiment the repetitive pattern may selected to start from the sides and move to the center of the reels. For example, the outermost reels may start to spin backwards while the centermost reels rotate in a forward direction. The backward spinning reels may then move towards the centermost reels. The player will as such be presented with a perceived feeling of the backward spinning reels moving to the centermost reels and as such implicitly understand the current status of the game.

With the above in mind, it may in some embodiments be desirable to control the individual spin weights such that the individual spin weight for each of the plurality of adjacently arranged graphically rotatable reels is set equal if the performance metric is above a predefined performance threshold. Accordingly, the present embodiment allows for a synchronization between the different individual spin weights, meaning that the individual spin weights in some situations may be "equalized" (or normalized) e.g. back to base setting, such that the individual spin weights stops from differentiating between the different reels. This embodiment may for example be useful following a “big win” resulting from a specific game within the plurality of consecutive games.

It may generally be desirable to allow the individual spin weight for each of the plurality of adjacently arranged graphically rotatable reels to be determined at each game of the sequence of a plurality of consecutive games. Accordingly, the above randomization factor will constantly be changing constantly from game to game. As is apparent from the above, this allows for an insurance of integrity of the game.

The scheme according to the present disclosure may be applied selectively to some or to all positions of the overall gaming scenario as is provided by means of the present gaming system. However, in some embodiments the gaming system is adapted to operate a main game and a bonus game, and the individual spin weight are applied only during the bonus game. The bonus game may in some embodiments be a promotional game following a specific achievement made by the player, and may in some embodiments include at least one of a free spin and a respin.

In some embodiments the server will transmit graphical data that is displayed at the graphical user interface (GUI) of the user device for achieving the spinning reel. However, to reduce the amount of data that is transmitted between the server and the user device it may as an alternative be possible to form control data (e.g. meta data) at the server that subsequently is transmitted to and used by the control unit for creating the graphical data to be displayed within the GUI at the user device. In some embodiments a bandwidth constrain in the network communication between the server and the user device controls if the server should transmit the graphical data of the control data. This embodiment also ensures that the game is progressing as effectively as possible and with a reduced computational load placed on the server, the network and the user device.

The server may in a corresponding manner be adapted to form a graphical representation of at least one of the table, the gaming outcome and the updated table, to be distributed to the electronic user device, where the graphical representation is then presented within the GUI. Similarly, the server may instead select to form control data to be used by the user device, where the user device instead will generate the graphical data to be displayed within the GUI at the user device.

Such a GUI may also be arranged to allow the player to directly interact with the server, for example allowing the player to control his/her participation in the game as well as to control a size of the bet placed when participating in the game.

Additionally, it may also be possible to allow the graphical representation to be set differently for different game operators, players or groups of players. The graphical representation may also be dependent on e.g. the geographical location of the players, such as dependent on city, country or continent where the player is located/registered.

Within the context of the present disclosure, it should be understood that it in some embodiments so that it may be possible to allow the server to control if a specific electronic user device is to be allowed to apply the scheme according to the present disclosure. Such control may for example be dependent on a geographical location of the electronic user device. Possibly, the geographical location may be selected from a group comprising a city, a country and a continent.

In some embodiments of the present disclosure the first game is a game of chance, such as for example a slot game, where the player is placing a bet to be allowed to participate in the game. The gaming outcome may in such an embodiment be dependent on the bet placed by the player.

According to another aspect of the present disclosure there is provided a gaming system, comprising a server comprising a monitoring module and a spin rendering module, and an electronic user device comprising a display screen providing a graphical user interface (GUI), wherein the electronic user device is connected to the server using a network connection, wherein the server is adapted to form a table having a predetermined dimension and comprising a plurality of adjacently arranged graphically rotatable reels, each graphically rotatable reel displaying a plurality of elements being one of a plurality of predefined element types, form, in response to a request from the electronic user device to initiate a game, a graphical representation of the rotatable reels at the GUI of the electronic user device, wherein the reels are rotating for a predefined rotating time period, and match, after the end of the predefined rotating time period, the elements at the adjacently arranged graphically rotatable reels with a plurality of predefined element formations stored at the server, wherein the server is further adapted to provide an outcome indicative of the element matching to the monitoring module, wherein the monitoring module in real-time determines a performance metric based on a plurality of element matching outcomes from subsequent games, provide the performance metric to the spin rendering module, wherein the spin rendering module in real-time and based on the performance metric determines an individual spin weight for each of the plurality of adjacently arranged graphically rotatable reels, and apply the determined individual spin weight for each of the plurality of adjacently arranged graphically rotatable reels to a subsequently formed graphical representation of the rotatable reels. This aspect of the present disclosure provides similar advantages and embodiments as discussed above in relation to the previous aspects of the present disclosure.

Preferably, the gaming system is a cloud-based computing system and the server is a cloud server. Thus, the computing power provided by means of the invention may be distributed between a plurality of servers, and the location of the servers must not be explicitly defined. Advantageous following the use of a cloud-based solution is also the inherent redundancy achieved.

In some embodiments the electronic user devices may be selected to include e.g. a computer (laptop/stationary), a mobile phone, a tablet, a (gaming) consoles or any other gaming device and gambling terminals. The GUI may in some embodiments be allowed to depend on the type of electronic user device.

According to a still further aspect of the present disclosure there is provided a computer program product comprising a computer readable medium having stored thereon computer program means for operating a gaming system, the gaming system comprising a server comprising a monitoring module and a spin rendering module, and an electronic user device comprising a display screen providing a graphical user interface (GUI), wherein the electronic user device is connected to the server using a network connection, wherein the computer program product comprises code for forming, at the server, a table having a predetermined dimension and comprising a plurality of adjacently arranged graphically rotatable reels, each graphically rotatable reel displaying a plurality of elements being one of a plurality of predefined element types, code for forming, in response to a request from the electronic user device to initiate a game, a graphical representation of the rotatable reels at the GUI of the electronic user device, wherein the reels are rotating for a predefined rotating time period, and code for matching, at the server and after the end of the predefined rotating time period, the elements at the adjacently arranged graphically rotatable reels with a plurality of predefined element formations stored at the server, wherein the computer program product further comprises code for providing, at the server, an outcome indicative of the element matching to the monitoring module, wherein the monitoring module in real-time determines a performance metric based on a plurality of element matching outcomes from subsequent games, code for providing, at the server, the performance metric to the spin rendering module, wherein the spin rendering module in real-time and based on the performance metric determines an individual spin weight for each of the plurality of adjacently arranged graphically rotatable reels, and code for applying, at the server, the determined individual spin weight for each of the plurality of adjacently arranged graphically rotatable reels to a subsequently formed graphical representation of the rotatable reels. Also this aspect of the present disclosure provides similar advantages and embodiments as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
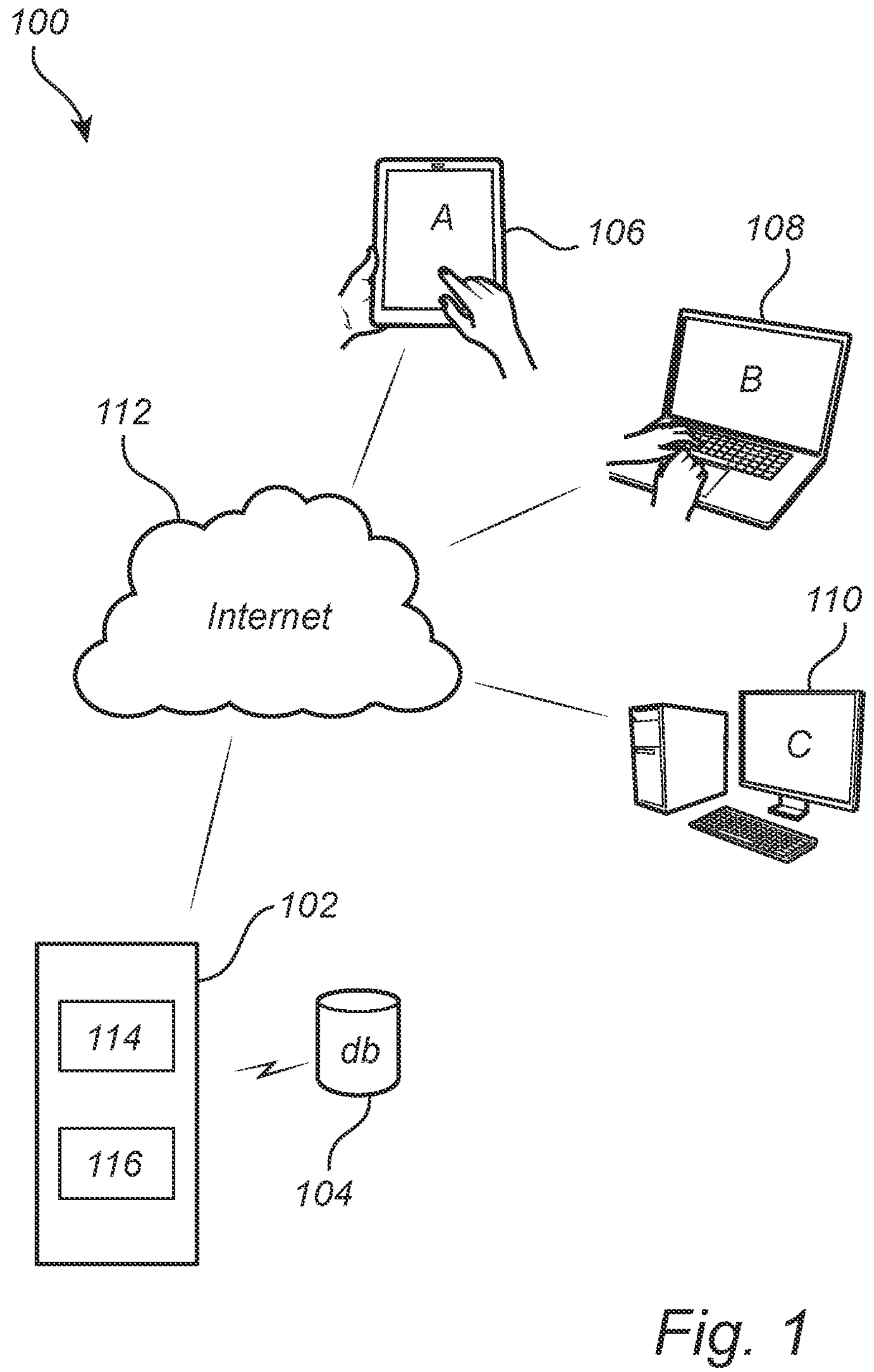
FIG. 1 illustrates an exemplary gaming system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness to fully convey the scope of the present disclosure to the skilled addressee. Like reference characters refer to like elements throughout.

Referring now to the drawings and FIG. 1 in particular, there is depicted a gaming system 100 in which an online game, such as a slot game, may be played according to a currently preferred embodiment of the present disclosure. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to a plurality of electronic user devices in the form of electronic user devices, such as client devices 106, 108, 110, etc. through network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, 5G mobile communications Bluetooth, infrared, or similar. As such, the network 112 may be locally and/or globally provided.

The gaming database 104 may be any type of physical unit on which games reside, such as a machine in a gaming venue, a lottery machine, an electronic game system, etc. Network 112 may be implemented as the Internet, or any local or wide area network, either public or private. Network 112 may also be a hardware system physically connecting some or all of the server 102 and client devices 106, 108, 110. Client devices 106, 108, 110, typically each operated by a player, may be implemented as any computing devices such as a personal computing device, a server, a server network, handheld computing device, slot machine, other gaming machine in a gaming venue such as a betting terminal, a gaming console, lottery machine, an interface in a virtual environment, etc.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

In line with the present disclosure the server 102 comprises a plurality of computational modules specifically adapted to perform dedicated tasks when operating at the server 102. One of these modules include a monitoring module 114, another one is a spin rendering module 116. The functionality of the monitoring module 114 and the spin rendering module 116 will be further elaborated below.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110, network 112 and further electronic user device 114 may be fixed systems, mobile systems, portable systems, or cloud systems (as discussed above). FIG. 1 shows only three electronic user devices 106, 108, 110, however it should be understood that a general implementation of the present disclosure comprises a large plurality of electronic user devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
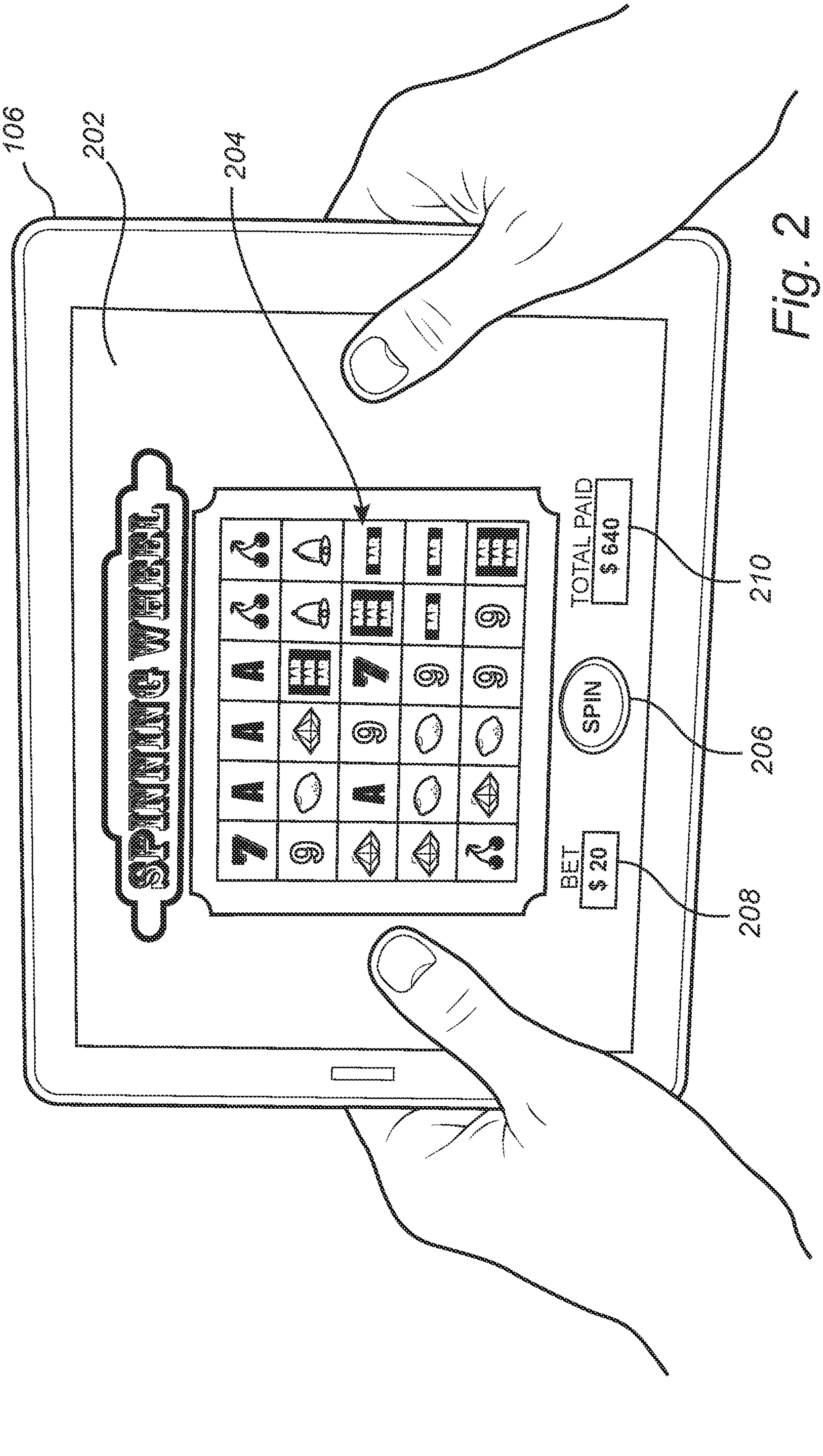
FIG. 2 provides an exemplary illustration of a typical graphical user interface (GUI) for use in playing a game.

Turning now to FIG. 2 illustrating a graphical user interface (GUI) 202 to be displayed at a client device, such as any of the client devices 106, 108, 110, in the illustrated embodiment provided as an application ("app") or within e.g. a web browser of the portable client device 106 being a tablet. The game to be played at the client device 106 is here shown as an online game of chance in the form of a slot game, visualized within the GUI 202 as comprising a table comprising six individual reels 204 arranged in columns and provided with a plurality of different symbols. The table also comprises five rows. As such, the predefined dimension of the table as shown in FIG. 2 is six times five, thus comprising 30 cells in total. In line with the present disclosure, the six reels 204 are arranged to be individually rotatable in relation to each other.

The GUI also comprises a "button" 206 to start the game, here provided with the description "SPIN" for initiating a turn of the game. In addition, the GUI 202 comprises an indicator of the current bet 208 (i.e. payment for each turn of the game) and an indicator of the total payment to the player 210. It should in any case be understood that other types of games may be played within the scope of the present disclosure, for example being skill based as compared to a game of chance.

Figure 3A:
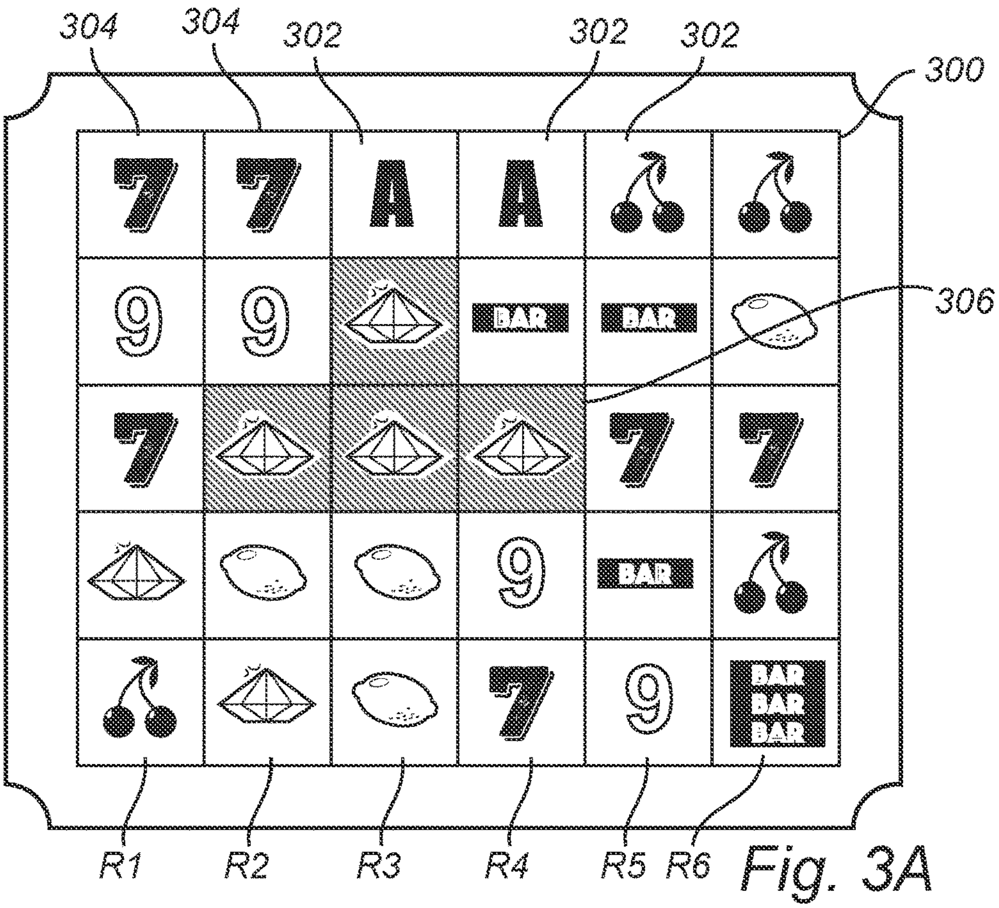
FIGS. 3A-3B present exemplary illustrations of operations of different tables according to different embodiments of the present disclosure.
Figure 3B:
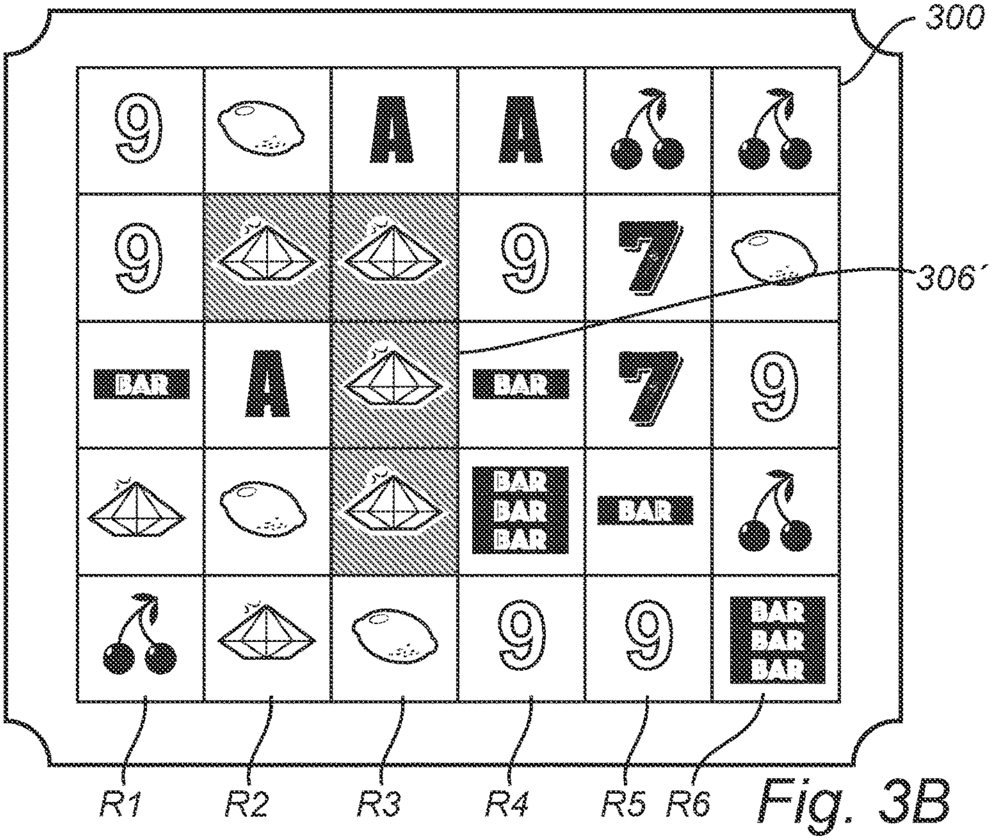
Figure 4:
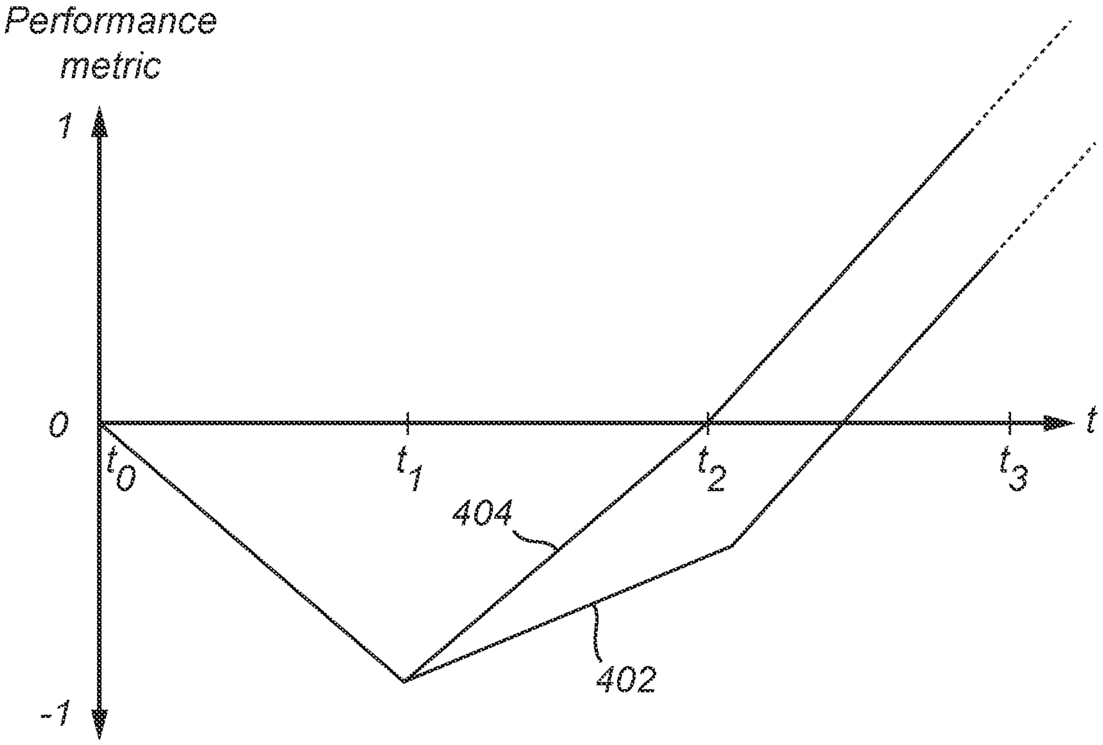
FIG. 4 is a diagram illustrating individual performance metric determinations.
Figure 5:
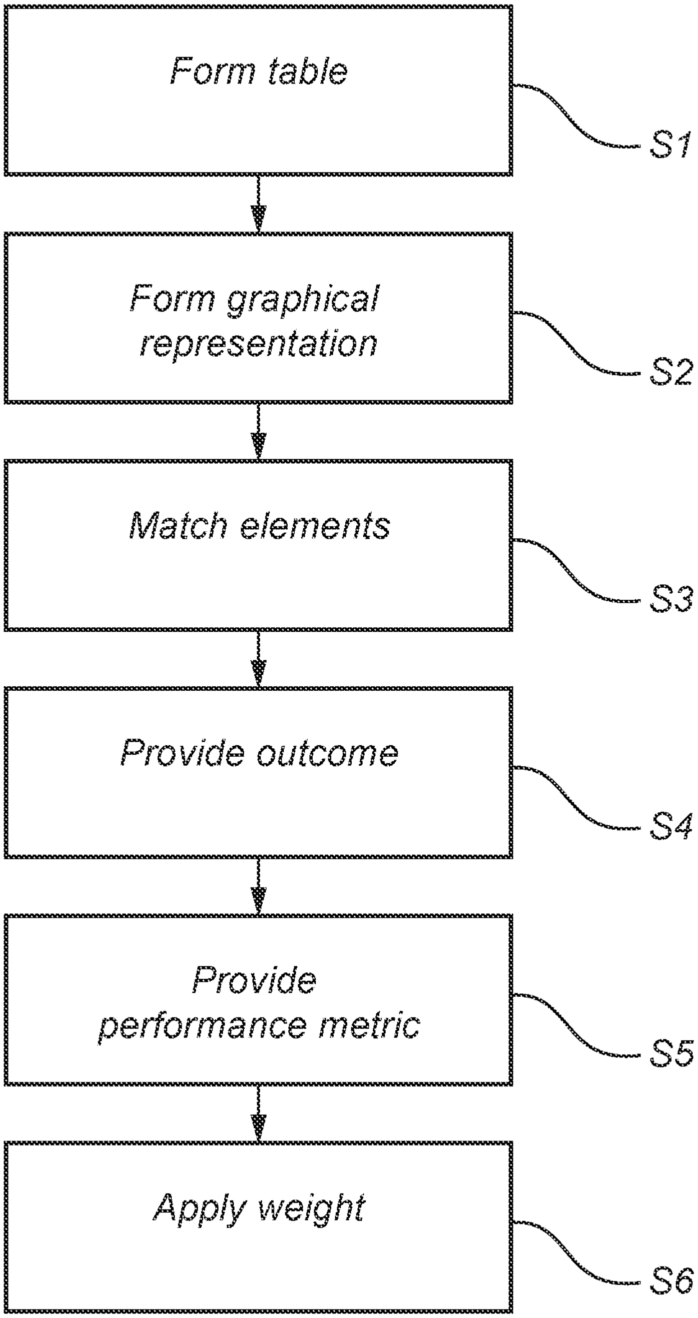
FIG. 5 is a flow chart illustrating the exemplary steps for operating the gaming system as shown in FIG. 1.

Turning now to FIGS. 3A and 3B in conjunction with FIGS. 4 and 5, illustrating different tables according to different embodiments of the present disclosure.

The operational process of the gaming system starts by the server 102 forming, S1, a graphical representation of a table 300 having a predetermined dimension and comprising a corresponding number of cells 302. The table 300 dimensionally corresponds to the table as exemplified in FIG. 2. It may of course be possible to include less or more rows and/or cells within the table. The server 102 also populates the cells 302 of table 300 with a first set of elements 304. The first set of elements 304 includes different element types, e.g. including numbers and pictograms/figures. It should be noted that any form of element types is possible and within the scope of the present disclosure, at least in case the game is a game of chance.

The player will then interact with e.g. the button 206, whereby the server 102 forms, S2, a graphical representation where the reels 204 appear to be rotating in a first direction. As an example, when the player initiates a first of a series of games the rotational direction will be the same for each of the reels 204, and will all be rotating in a "downward direction". The rotation takes place during a predefined rotating time period.

Once the rotation has stopped, the server 102 performs an automated process of matching, S3, a cluster 306 of matching elements within the table 300, which in line with the present disclosure is defined as an "element matching outcome".

The element matching outcome is in accordance with the present disclosure provided, S4, to the monitoring module 114. The monitoring module 114 will here process a flow of element matching outcome relating to different games and determine performance metric based on the flow of element matching outcomes from subsequent games. With reference to FIG. 4, during a first time period between t0 and t1, the games played by the player does not result in the formation of a cluster, and thus the element matching outcome is zero. Accordingly, the monitoring module 114 will in such an example determine that the performance metric is constantly decreasing due to the "loosing streak" during the time period from t0 to t1. In FIG. 4, the performance metric is seen to decreasing from zero towards negative one (normalized values). It should be understood that the performance metric generally, but not necessarily, may be individually determined for each of the reels 204. As will be discussed below, the performance metric for a specific reel 204 may for example be dependent on if that specific reel 204 is "involved" in the formation of a winning cluster. In FIG. 4, two performance metrics 402 and 404 for two individual reels R2 and R3 of the six reels 204 (i.e. comprising reels R1-R6) are illustrated. Similar determinations are of course made in relation to the remaining reels.

The performance metric determined by the monitoring module 114 will in turn be provided, S5, to the spin rendering module 116. The spin rendering module 116 will as explained above make use of the performance metric as a seed for determining a spin weight for each of the reels 204. In some embodiments the value of the performance metric/seed is used in part as an input to a random function generator that is used for controlling a reel spin direction, a reel speed, a reel initiation offset time, a reel rotation duration, etc.

Subsequently, the determined individual spin weights will then be applied, S6, each of the plurality of adjacently arranged graphically rotatable reels to a subsequently formed graphical representation of the rotatable reels. Accordingly, the rotation of the reels 204 in relation to the "next" game in the series of game will be dependent on the performance in earlier games.

A further elaboration in relation to the above is provided in relation to FIG. 3A. Here, the game has progressed to all the way to time t1, where a "winning" cluster 306 is formed and the element matching outcome thus is "positive". As is seen in FIG. 3A, the reel R2 includes a single "diamond", whereas the reel R3 includes two diamonds. Accordingly, here the monitoring module 114 will consider the reel R3 to be more involved in the positive element matching outcome as compared to reel R2. Therefore, the performance metric 404 relating to reel R3 will turn more quickly towards a positive performance metric as compared to the performance metric 402 relating to reel R2.

At time t2, a further positive element matching outcome is identified by means of cluster 306'. Here the cluster 306' includes three diamonds in reel R3 and only a single diamond. Therefore, and in line with the above, the monitoring module 114 will again consider the reel R3 to be more involved in the positive element matching outcome as compared to reel R2. Thus, the performance metric 404 will more quickly drive towards positive one as compared to performance metric 402.

From the above it will be understood that the "seed" for the reels 204 (R1-R6) will fluctuate and may be allowed to be completely independent of each other. Accordingly, the scheme according to the present disclosure allows for a completely independent randomization of how the reels 204 are rotating (speed, direction, etc.) and thus the overall randomness of the series of games.

In summary, the present disclosure relates to a computer implemented method performed by a computer implemented method performed by a gaming system, the gaming system comprising a server comprising a monitoring module and a spin rendering module, and an electronic user device comprising a display screen providing a graphical user interface (GUI), wherein the electronic user device is connected to the server using a network connection, wherein the method comprises forming, at the server, a table having a predetermined dimension and comprising a plurality of adjacently arranged graphically rotatable reels, each graphically rotatable reel displaying a plurality of elements being one of a plurality of predefined element types, forming, in response to a request from the electronic user device to initiate a game, a graphical representation of the rotatable reels at the GUI of the electronic user device, wherein the reels are rotating for a predefined rotating time period, and matching, at the server and after the end of the predefined rotating time period, the elements at the adjacently arranged graphically rotatable reels with a plurality of predefined element formations stored at the server, wherein the method further comprises providing, at the server, an outcome indicative of the element matching to the monitoring module, wherein the monitoring module in real-time determines a performance metric based on a plurality of element matching outcomes from subsequent games, providing, at the server, the performance metric to the spin rendering module, wherein the spin rendering module in real-time and based on the performance metric determines an individual spin weight for each of the plurality of adjacently arranged graphically rotatable reels, and applying, at the server, the determined individual spin weight for each of the plurality of adjacently arranged graphically rotatable reels to a subsequently formed graphical representation of the rotatable reels.

Generally, when the operational scheme according to the present disclosure is applied to a game concept provided by the server, it may be possible to increase the randomization of the game, thus potentially allowing for increasing winning possibilities for a player participating in the game. An advantage following such a possibility is an improved attraction power to the game, thus potentially allowing for the player to remain playing the game for an increased duration as compared to previously known similar operational schemes. This could potentially be beneficial to both the player participating in the game and the gaming operator providing the game.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

What is claimed is:

1. A computer implemented method performed by a gaming system, the gaming system comprising:

a server comprising a monitoring module and a spin rendering module, and an electronic user device comprising a display screen providing a graphical user interface (GUI), wherein the electronic user device is connected to the server using a network connection, wherein the method comprises:

forming, at the server, a table having a predetermined dimension and comprising a plurality of adjacently arranged graphically rotatable reels, each graphically rotatable reel displaying a plurality of elements being one of a plurality of predefined element types, forming, in response to a request from the electronic user device to initiate a game, a graphical representation of the rotatable reels at the GUI of the electronic user device, wherein the reels are rotating for a predefined rotating time period, and matching, at the server and after the end of the predefined rotating time period, the elements at the adjacently arranged graphically rotatable reels with a plurality of predefined element formations stored at the server, wherein each of the predefined element formations comprises a cluster of matching elements, wherein the method further comprises:

providing, at the server, an outcome indicative of the element matching to the monitoring module, wherein the monitoring module in real-time determines a performance metric based on a plurality of element matching outcomes from the game and previously completed games, providing, at the server, the performance metric to the spin rendering module, wherein the spin rendering module in real-time and based on the performance metric determines an individual spin weight for each of the plurality of adjacently arranged graphically rotatable reels, wherein the individual spin weight for each respective reel is dependent on a number of elements in the cluster of matching elements of the outcome located in the respective reel, and applying, at the server, the determined individual spin weight for each of the plurality of adjacently arranged graphically rotatable reels to a subsequently formed graphical representation of the rotatable reels, wherein forming the graphical representation of the rotatable reels at the GUI of the electronic user device comprises generating, by the server, non-graphical control data, and transmitting, by the server and to the electronic user device, the control data such that the electronic user device (i) generates the graphical representation based on the control data, and (ii) displays the graphical representation in the GUI.

2. The method according to claim 1, wherein the individual spin weight is arranged to control at least one of:

a spinning direction of the reel, a rotational speed of the reel, a rotational order for each of the plurality of adjacently arranged graphically rotatable reels, an offset for initiating a rotation of the reel, and the predefined rotating time period for the reel.

3. The method according to claim 1, wherein the individual spin weight for the plurality of adjacently arranged graphically rotatable reels is dependent on a predefined rotational order for all of the plurality of adjacently arranged graphically rotatable reels.

4. The method according to claim 1, wherein the individual spin weight for each of the plurality of adjacently arranged graphically rotatable reels is set equal if the performance metric is above a predefined performance threshold.

5. The method according to claim 1, wherein the individual spin weight for each of the plurality of adjacently arranged graphically rotatable reels is determined at each game of a sequence of a plurality of consecutive games.

6. The method according to claim 1, wherein:

the gaming system is adapted to operate a main game and a bonus game, and the individual spin weights are applied only during the bonus game.

7. The method according to claim 6, wherein the bonus game includes at least one of a free spin and a respin.

8. A gaming system, comprising:

a server comprising a monitoring module and a spin rendering module, and an electronic user device comprising a display screen providing a graphical user interface (GUI), wherein the electronic user device is connected to the server using a network connection, wherein the server is adapted to:

form a table having a predetermined dimension and comprising a plurality of adjacently arranged graphically rotatable reels, each graphically rotatable reel displaying a plurality of elements being one of a plurality of predefined element types, form, in response to a request from the electronic user device to initiate a game, a graphical representation of the rotatable reels at the GUI of the electronic user device, wherein the reels are rotating for a predefined rotating time period, and match, after the end of the predefined rotating time period, the elements at the adjacently arranged graphically rotatable reels with a plurality of predefined element formations stored at the server, wherein each of the predefined element formations comprises a cluster of matching elements, wherein the servers is further adapted to:

provide an outcome indicative of the element matching to the monitoring module, wherein the monitoring module in real-time determines a performance metric based on a plurality of element matching outcomes from the game and previously completed games, provide the performance metric to the spin rendering module, wherein the spin rendering module in real-time and based on the performance metric determines an individual spin weight for each of the plurality of adjacently arranged graphically rotatable reels, wherein the individual spin weight for each respective reel is dependent on a number of elements in the cluster of matching elements of the outcome located in the respective reel, and apply the determined individual spin weight for each of the plurality of adjacently arranged graphically rotatable reels to a subsequently formed graphical representation of the rotatable reels, wherein forming the graphical representation of the rotatable reels at the GUI of the electronic user device comprises generating, by the server, non-graphical control data, and transmitting, by the server and to the electronic user device, the control data such that the electronic user device (i) generates the graphical representation based on the control data, and (ii) displays the graphical representation in the GUI.

9. The gaming system according to claim 8, wherein the individual spin weight is arranged to control at least one of:

a spinning direction of the reel, a rotational speed of the reel, a rotational order for each of the plurality of adjacently arranged graphically rotatable reels, an offset for initiating a rotation of the reel, and the predefined rotating time period for the reel.

10. The gaming system according to claim 8, wherein the individual spin weight for the plurality of adjacently arranged graphically rotatable reels is dependent on a predefined rotational order for all of the plurality of adjacently arranged graphically rotatable reels.

11. The gaming system according to claim 8, wherein the individual spin weight for each of the plurality of adjacently arranged graphically rotatable reels is set equal if the performance metric is above a predefined performance threshold.

12. The gaming system according to claim 8, wherein the individual spin weight for each of the plurality of adjacently arranged graphically rotatable reels is determined at each game of a sequence of a plurality of consecutive games.

13. The gaming system according to claim 8, wherein:

the gaming system is adapted to operate a main game and a bonus game, and the individual spin weights are applied only during the bonus game.

14. The gaming system according to claim 13, wherein the bonus game includes at least one of a free spin and a respin.

15. A computer program product comprising a non-transitory computer readable medium having stored thereon computer program means for operating a gaming system, the gaming system comprising:

a server comprising a monitoring module and a spin rendering module, and an electronic user device comprising a display screen providing a graphical user interface (GUI), wherein the electronic user device is connected to the server using a network connection, wherein the computer program product comprises:

code for forming, at the server, a table having a predetermined dimension and comprising a plurality of adjacently arranged graphically rotatable reels, each graphically rotatable reel displaying a plurality of elements being one of a plurality of predefined element types, code for forming, in response to a request from the electronic user device to initiate a game, a graphical representation of the rotatable reels at the GUI of the electronic user device, wherein the reels are rotating for a predefined rotating time period, and code for matching, at the server and after the end of the predefined rotating time period, the elements at the adjacently arranged graphically rotatable reels with a plurality of predefined element formations stored at the server, wherein each of the predefined element formations comprises a cluster of matching elements, wherein the computer program product further comprises:

code for providing, at the server, an outcome indicative of the element matching to the monitoring module, wherein the monitoring module in real-time determines a performance metric based on a plurality of element matching outcomes from the game and previously completed games, code for providing, at the server, the performance metric to the spin rendering module, wherein the spin rendering module in real-time and based on the performance metric determines an individual spin weight for each of the plurality of adjacently arranged graphically rotatable reels, wherein the individual spin weight for each respective reel is dependent on a number of elements in the cluster of matching elements of the outcome located in the respective reel, and code for applying, at the server, the determined individual spin weight for each of the plurality of adjacently arranged graphically rotatable reels to a subsequently formed graphical representation of the rotatable reels, wherein forming the graphical representation of the rotatable reels at the GUI of the electronic user device comprises generating, by the server, non-graphical control data, and transmitting, by the server and to the electronic user device, the control data such that the electronic user device (i) generates the graphical representation based on the control data, and (ii) displays the graphical representation in the GUI.

* * * * *